(12) United States Patent
Meinherz et al.

(10) Patent No.: US 6,697,247 B1
(45) Date of Patent: Feb. 24, 2004

(54) HIGH VOLTAGE SYSTEM HAVING AT LEAST ONE DEVICE FOR OPTICALLY DETECTING A PARAMETER

(75) Inventors: Manfred Meinherz, Berlin (DE); Michael Suhr, Glienicke (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/647,271

(22) PCT Filed: Mar. 26, 1999

(86) PCT No.: PCT/DE99/01001

§ 371 (c)(1),
(2), (4) Date: Aug. 29, 2001

(87) PCT Pub. No.: WO99/49484

PCT Pub. Date: Sep. 30, 1999

(30) Foreign Application Priority Data

Mar. 27, 1998 (DE) ....................... 298 06 211 U

(51) Int. Cl.$^7$ ............................................. H01H 73/00
(52) U.S. Cl. ....................................................... 361/115
(58) Field of Search ................................. 361/115, 102; 200/17 R, 48 R; 218/143

(56) References Cited

U.S. PATENT DOCUMENTS 5,142,550 A * 8/1992 Tymes ........................ 375/141
5,303,112 A * 4/1994 Zulaski et al. ................ 361/67

FOREIGN PATENT DOCUMENTS

| DE | 2107992 | * 2/1975 | ............ H01H/9/16 |
| DE | 195 13 460 | 2/1998 | |
| DE | 197 08 460 | 2/1998 | |
| DE | 298 06 211 | 6/1998 | |
| FR | 2 713 308 | 6/1995 | |

* cited by examiner

Primary Examiner—Gregg Scott
Assistant Examiner—Boris Benenson
(74) Attorney, Agent, or Firm—Kenyon & Kenyon

(57) ABSTRACT

In a high voltage system having a device for optical detection of a parameter of a high voltage device, an optically detectable code is provided in the detection range of the device and permits an assignment of the parameter to a specific location in the high voltage system.

6 Claims, 1 Drawing Sheet

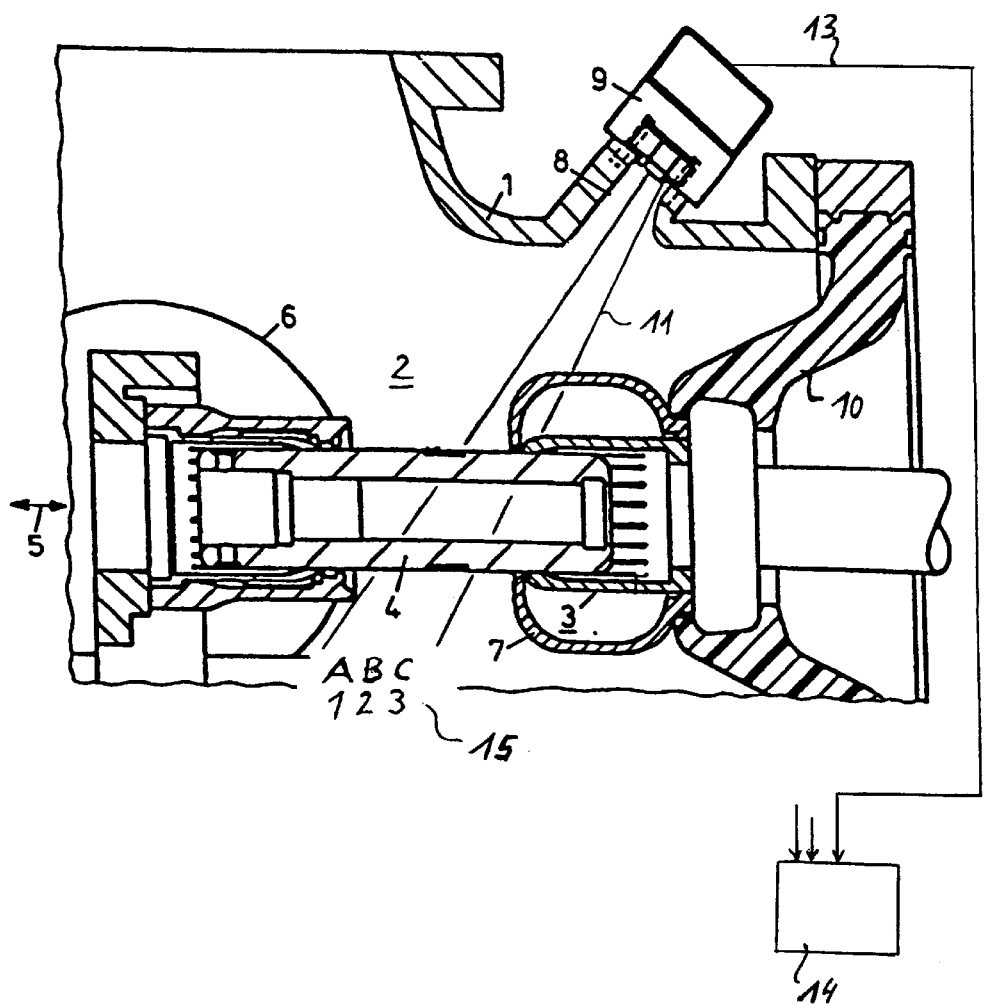

HIGH VOLTAGE SYSTEM HAVING AT LEAST ONE DEVICE FOR OPTICALLY DETECTING A PARAMETER

FIELD OF THE INVENTION

The present invention relates to a high voltage system having high voltage devices and at least one device for optical detection of a parameter of a high voltage device, the device for optical detection having at least one optical sensor in whose detection range the change in a parameter that is to be detected can be represented optically.

BACKGROUND INFORMATION

German Patent Application No. 197 08 460 describes a high voltage system in which the switch position of the isolating switch is detected as a parameter by an optical sensor in a high voltage device, which is formed there by a high voltage isolating switch.

The measured values thus detected can be sent as light signals to a processing unit by means of optical fibers or as electronic signals.

The problem with such devices is that the parameters detected must be assigned to individual high voltage devices in order to be able to draw the proper conclusions from the measured values.

For example, in the case of one high voltage isolating switch per phase, it is important to be able to correctly assign the individual measured values to the proper phases.

The object of the present invention is to permit a correct assignment of the detected parameters to specific high voltage devices in the case of a high voltage system.

This object is achieved according to the present invention by the fact that an optically detectable code is provided in the detection range and can also be detected by the sensor in addition to the parameter that is to be detected and thus permits an assignment of the parameter to a specific location in the high voltage system.

The code can be implemented, for example, by a surface that is colored or patterned in a certain manner, a bar code, numbers or letters.

The detected code can then be assigned electronically and converted so that a downstream processing unit can assign the respective parameter detected to a specific high voltage device, e.g., by means of equipment identifiers, regardless of any possible installation errors.

It is advantageous for the sensor to be formed by an electronic camera.

In this case, a complicated code can be detected by the camera.

The code can be assigned at the site of the processing unit either by operating personnel or by digital image processing and analysis.

The present invention can be used to particular advantage with high voltage switches, where the switch position of the high voltage switch can be detected effectively as a parameter.

BRIEF DESCRIPTION OF THE DRAWING

The FIGURE shows schematically in a longitudinal section an isolating switch with a monitoring camera.

DETAILED DESCRIPTION

An isolating switch 2 having a stationary contact cluster 3 and a movable hollow contact pin 4 is arranged in a housing 1 of a high voltage system. Movable contact pin 4 is movable axially in the direction of arrows 5 and can be driven by a drive (not shown).

Stationary contact cluster 3 is surrounded by a screening electrode 7 and is supported in a stationary insulating support 10. Movable contact pin 4 is shielded by a screening electrode 6.

A camera 9 is flange-mounted on a connection 8 of housing 1 in an airtight connection, where the monitoring range of the camera is indicated by cone 11.

An image of isolating switch 2 is recorded by camera 9, permitting detection of the switch position, and this image is transmitted over line 13 to a processing unit 14. A code 15 in the form of letters and numbers is arranged on the inside wall of housing 1 within transmission area 11 of camera 9, thus allowing the camera image to be assigned to a specific isolating switch 2. In this way, the image of isolating switch 2 available in processing unit 14 can be differentiated from other images of other high voltage devices transmitted by other cameras (not shown).

The code may also be in the form of a bar code or some other code preferably machine readable. It may also be provided on the surface of components that carry a high voltage.

The illustration of the code in the drawing is to be understood symbolically and is shown from the angle of camera 9.

What is claimed is:

1. A high voltage system, comprising:
   a high voltage device;
   at least one device for optical detection of a parameter of the high voltage device, the at least one device for optical detection including at least one optical sensor having a detection range within which detection range a change in the parameter is represented optically; and
   an optically detectable code provided in the detection range and detectable by the at least one device for optical detection so that the parameter may be assigned to a specific location in the high voltage system.

2. The high voltage system according to claim 1, wherein the sensor includes an electronic camera.

3. The high voltage system according to claim 1, wherein the high voltage device is a high voltage switch.

4. The high voltage system according to claim 3, wherein the parameter is a switch position of the high voltage switch.

5. The high voltage system according to claim 1, wherein the device for optical detection includes at least one processing unit configured to digitally process measured values of the sensor and to analyze the code.

6. A high voltage system, comprising:
   a high voltage device;
   at least one device for optical detection of a parameter of the high voltage device, the at least one device for optical detection including at least one optical sensor having a detection range within which detection range a change in the parameter is represented optically; and
   an optically detectable code provided in the detection range and detectable by the at least one device for optical detection;
   wherein the at least one device for optical detection is configured to optically detect both the change in the parameter and optically detectable code so that the parameter may be assigned to a specific location in the high voltage system.

* * * * *